US012583004B2

(12) United States Patent
Daviot et al.

(10) Patent No.: US 12,583,004 B2
(45) Date of Patent: Mar. 24, 2026

(54) FLUID PRODUCT DISPENSER

(71) Applicant: APTAR FRANCE SAS, Le Neubourg (FR)

(72) Inventors: Stephane Daviot, Graveron Semerville (FR); Francis Moreau, Sotteville les Rouen (FR)

(73) Assignee: APTAR FRANCE SAS, Le Neubourg (FR)

( * ) Notice: Subject to any disclaimer, the term of this patent is extended or adjusted under 35 U.S.C. 154(b) by 186 days.

(21) Appl. No.: 18/290,200

(22) PCT Filed: May 10, 2022

(86) PCT No.: PCT/FR2022/050890
§ 371 (c)(1),
(2) Date: Nov. 10, 2023

(87) PCT Pub. No.: WO2022/238652
PCT Pub. Date: Nov. 17, 2022

(65) Prior Publication Data

US 2024/0139762 A1 May 2, 2024

(30) Foreign Application Priority Data

May 12, 2021 (FR) ....................................... 2105043

(51) Int. Cl.
*B05B 11/00* (2023.01)
*B05B 11/04* (2006.01)

(52) U.S. Cl.
CPC ........ *B05B 11/0078* (2013.01); *B05B 11/048* (2013.01)

(58) Field of Classification Search
CPC ............... B05B 11/0078; B05B 11/048; B05B 12/1409; A45D 34/04; B65D 83/0094
See application file for complete search history.

(56) References Cited

U.S. PATENT DOCUMENTS 6,158,674 A * 12/2000 Humphreys ........ B05B 11/1001 222/321.9
6,540,118 B1 * 4/2003 Marciano ................ A47L 13/51 401/126
7,726,517 B2 * 6/2010 Kennedy ............. B05B 11/1001 222/321.6

FOREIGN PATENT DOCUMENTS

EP 0 326 468 A2 8/1989
FR 2 971 681 A1 8/2012
(Continued)

OTHER PUBLICATIONS

International Search Report for PCT/FR2022/050890 dated Sep. 6, 2022.
(Continued)

*Primary Examiner* — Vishal Pancholi
(74) *Attorney, Agent, or Firm* — Sughrue Mion, PLLC

(57) ABSTRACT

A dispenser having a dispensing member connected to a main reservoir containing a first fluid product, the dispensing member communicating with a main axial outlet orifice, and a plurality of secondary reservoirs containing a second fluid product and each having a mobile wall, and a push-button that can be moved along an actuation axis, carrying with it the main outlet orifice. The push-button defines as many secondary outlet orifices as there are secondary reservoirs, the secondary outlet orifices being distinct from the main axial outlet orifice, each secondary outlet orifice being fed from a secondary reservoir in response to the movement of its mobile wall, which movement is brought about by the movement of the push-button along the actuation axis.

20 Claims, 6 Drawing Sheets

(56) References Cited

FOREIGN PATENT DOCUMENTS

Figure 1:
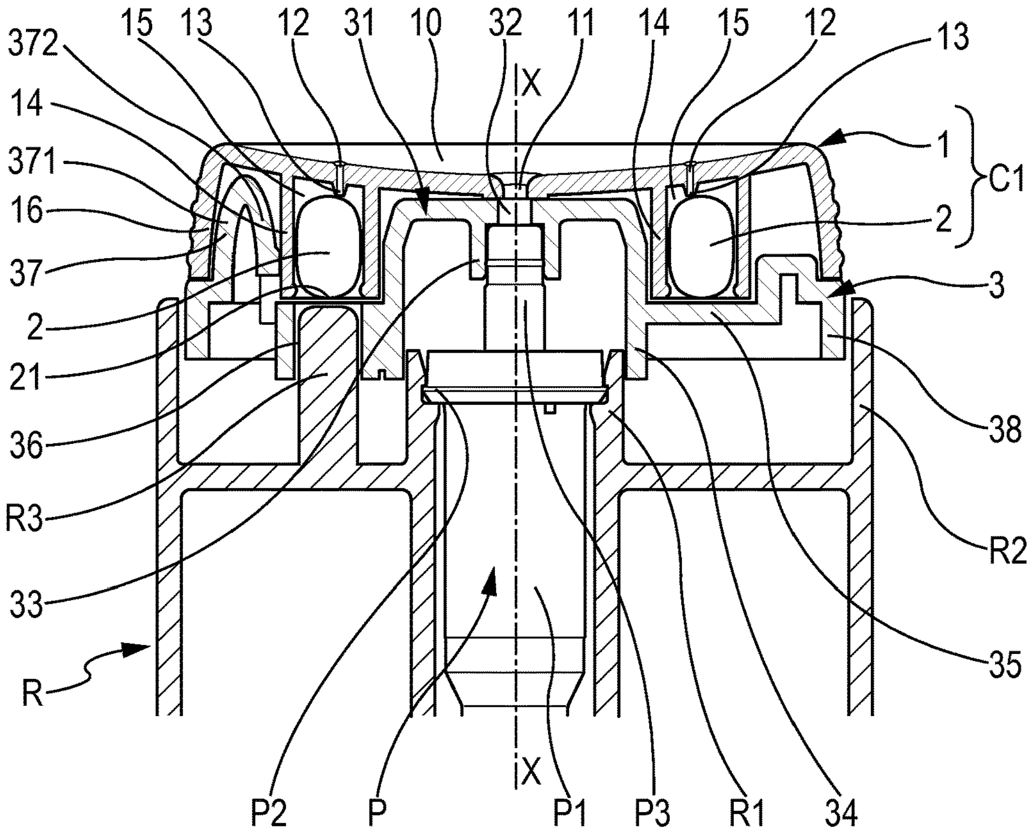

| | | | |
|---|---|---|---|
| KR | 10-2019-0045751 | A | 5/2019 |
| KR | 10-2238256 | B1 | 4/2021 |
| WO | 2012/113749 | A1 | 8/2012 |

OTHER PUBLICATIONS

International Preliminary Report on Patentability (with translation of Written Opinion) dated Nov. 14, 2023, issued in International Application No. PCT/FR2022/050890.

* cited by examiner

FLUID PRODUCT DISPENSER

CROSS REFERENCE TO RELATED APPLICATIONS

This application is a National Stage of International Application No. PCT/FR2022/050890 filed May 10, 2022, claiming priority based on French Patent Application No. 2105043 filed May 12, 2021.

The present invention relates to a fluid dispenser comprising a dispensing member (pump or valve) connected to a main reservoir containing a first fluid product. The dispensing member communicates with a main axial outlet orifice which moves along an actuation axis. The dispenser also comprises a plurality of secondary reservoirs containing a second fluid product and each having a mobile wall, as well as a push button which can be moved along the actuation axis carrying the main outlet orifice with it. Such dispensers are used in the fields of cosmetics, perfumery, or indeed pharmacy.

In the prior art, document WO 2012/113749 A1 is already known and describes several dispensers of this type. In accordance with one embodiment of that document, the dispenser comprises a rotary annular barrel which forms a plurality of reservoirs. The outer periphery of that barrel is accessible so that it can be driven in rotation. The rotary barrel is removably mounted under a push button which moves axially, but is prevented from rotating. This is explained by the fact that the push button comprises a central orifice for the valve and an offset orifice that is common to all the reservoirs of the rotary barrel. Each reservoir must be brought above a fixed stud by rotating the barrel in order to crush the reservoir on this stud and deliver its contents through the offset orifice, which must therefore also be positioned above the stud. This implies that the push button must be angularly oriented so that its offset orifice is axially aligned with the fixed stud. That document does not describe how the push button and the barrel are oriented with respect to the fixed stud. The objective of the present invention is to improve this dispenser, both in terms of its design and its use. The risk of fluid product leakage or residue at the offset orifice must be eliminated. The rotation of the barrel should be easier. The stability of the barrel must be ensured. Replacing the barrel should be simpler.

To this end, the present invention proposes a fluid product dispenser comprising:

- a dispensing member, such as a pump or a valve, connected to a main reservoir containing a first fluid product, the dispensing member communicating with a main axial outlet orifice which moves along an actuation axis, and
- a plurality of secondary reservoirs containing a second fluid product and each having a mobile wall to reduce the volume of the secondary reservoir and deliver the second fluid product from the secondary reservoir,
- a push button that can be moved along the actuation axis carrying the main outlet orifice with it,
- characterized in that the push button defines as many secondary outlet orifices as there are secondary reservoirs, the secondary outlet orifices being distinct from the main axial outlet orifice and surrounding the main axial outlet orifice, each secondary outlet orifice being fed from a secondary reservoir in response to the displacement of its mobile wall brought about by the displacement of the push button along the actuation axis.

Thus, each secondary reservoir supplies its own secondary outlet orifice, in a manner such that there is no relative movement, in particular in rotation, between the secondary reservoirs and the push button.

In a particularly advantageous aspect of the invention, the push button and the secondary reservoirs form a removable cartridge unit that is rotatably mounted about the main axial outlet orifice and the actuation axis. While the push button and the barrel of document WO 2012/113749 A1 are two separate parts that can be separated and rotated with respect to one another, the push button and the secondary reservoirs of the invention are integral and thus form a unit.

In accordance with an advantageous feature, the removable cartridge unit is elastically ejected from the dispensing member after a rotational movement over a predetermined angle, advantageously of the order of 360°. In practice, the user presses the cartridge unit axially against the dispensing member against elastic means and then rotates it through a small angle, for example of the order of 10°. The cartridge unit is then connected, but can rotate upon itself. The user can then rotate it until it reaches a retracted position at the end of its path where it is released and ejected by the elastic means.

In accordance with another feature of the invention, the mobile wall of each secondary reservoir comes into successive engagement with a fixed stud for pressing under the action of the push button. Advantageously, the dispenser may comprise angular positioning means for fixing the angular position of each secondary reservoir in turn by rotation to above the fixed pressing stud. Thus, the user does not have to search for the precise angular position of the cartridge unit by trial and error. When the user turns it, stable positions will be perceived that correspond to the successive axial alignments of the secondary reservoirs above the fixed pressing stud.

In accordance with one embodiment of the invention, the main outlet orifice is surrounded by a main collection area that is integral with the dispensing member, the secondary outlet orifices are surrounded by a secondary collection area formed by the push button, the two main and secondary areas being connected in alignment. Preferably, the main area is central and the secondary area surrounds the main area. Thus, the secondary area may be part of a removable cartridge unit, while the primary area remains in place on the dispensing member. The secondary area is therefore applied around the main area without generating a major discontinuity between them. The cartridge unit may have an overall configuration that is similar to a doughnut (doughnut-shaped).

In accordance with another embodiment of the invention, the push button defines both the main axial outlet orifice and the secondary outlet orifices, surrounded by a single common collection area. The cartridge unit may have an overall configuration similar to a puck.

In accordance with another aspect of the invention, the push button may form internal housings in which the secondary reservoirs in the form of crushable capsules filled with second fluid product are received, each internal housing advantageously being provided with a puncturing needle that leads to the secondary outlet orifice. In a variation, the push button may form internal compartments sealed by deformable membranes acting as mobile walls. Advantageously, the deformable membrane may be selected from a fold-back membrane and a stretchable membrane.

In accordance with one auspicious embodiment, the dispensing member comprises an actuating pin that is movable along the actuation axis, this actuating pin being capped by a plate that is axially movable, but prevented from rotating, the plate forming a central head that is engaged with the actuating pin and an off-axis through aperture for a fixed pressing stud that locks the plate against rotation, the push button being removably mounted on the plate and rotatable about the central head so as to be able to position a secondary reservoir one at a time above the fixed pressing stud which will crush the secondary reservoir and therefore deliver the second fluid product through the secondary outlet orifice each time the push button is actuated, which simultaneously causes the dispensing member to be actuated to deliver the first fluid product through the main axial outlet orifice. The central head may form the main axial outlet orifice and a main collection area that surrounds the main axial outlet orifice. In a variation, the central head may be covered by the push button which forms both the main axial outlet orifice and the secondary outlet orifices, surrounded by a single common collection area.

The concept of the present invention resides in assigning an outlet orifice to each secondary reservoir. The combination of the push button that forms the secondary outlet orifices and the secondary reservoirs in the form of a replaceable removable cartridge or refill is a particularly advantageous feature of the invention. The ejection and angular positioning means of the cartridge are very practical and provide for comfortable use. The cartridge forms the secondary outlet orifices and may further form the main axial outlet orifice. The plate makes it possible to receive the cartridge with greater stability, especially when the plate is guided axially.

The invention will now be described in more detail below, with reference to the accompanying drawings which show two embodiments of the invention by way of non-limiting examples.

Figure 2:
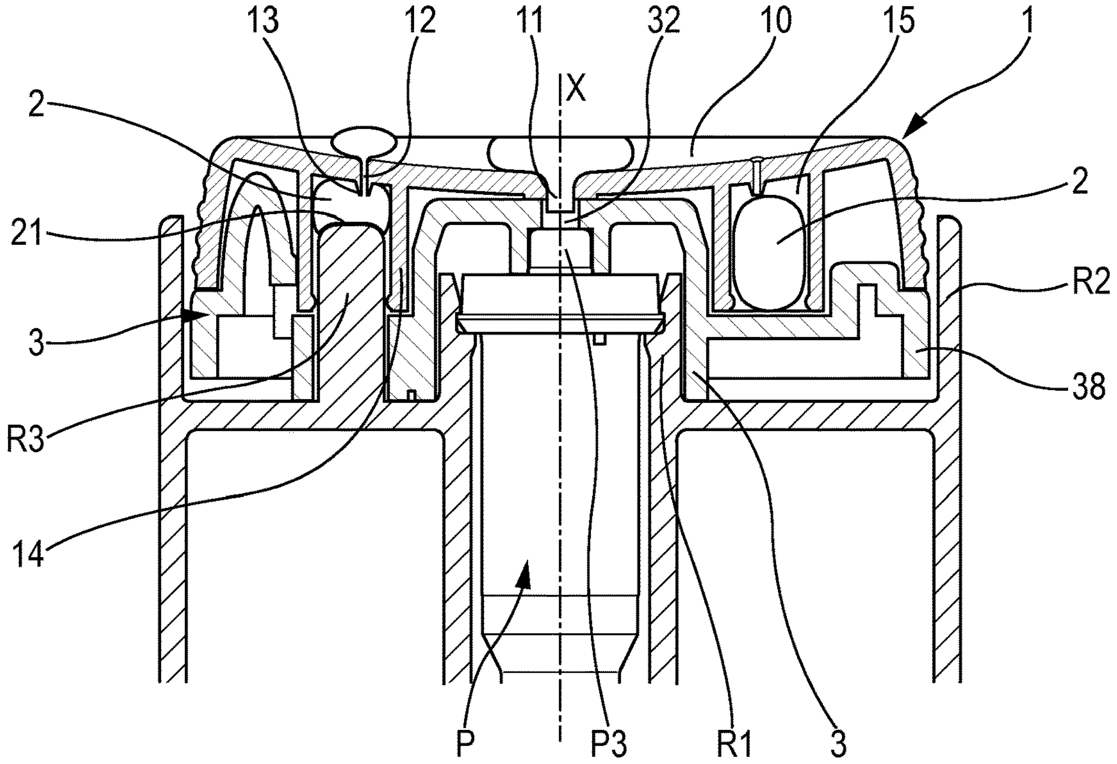
Figure 3:
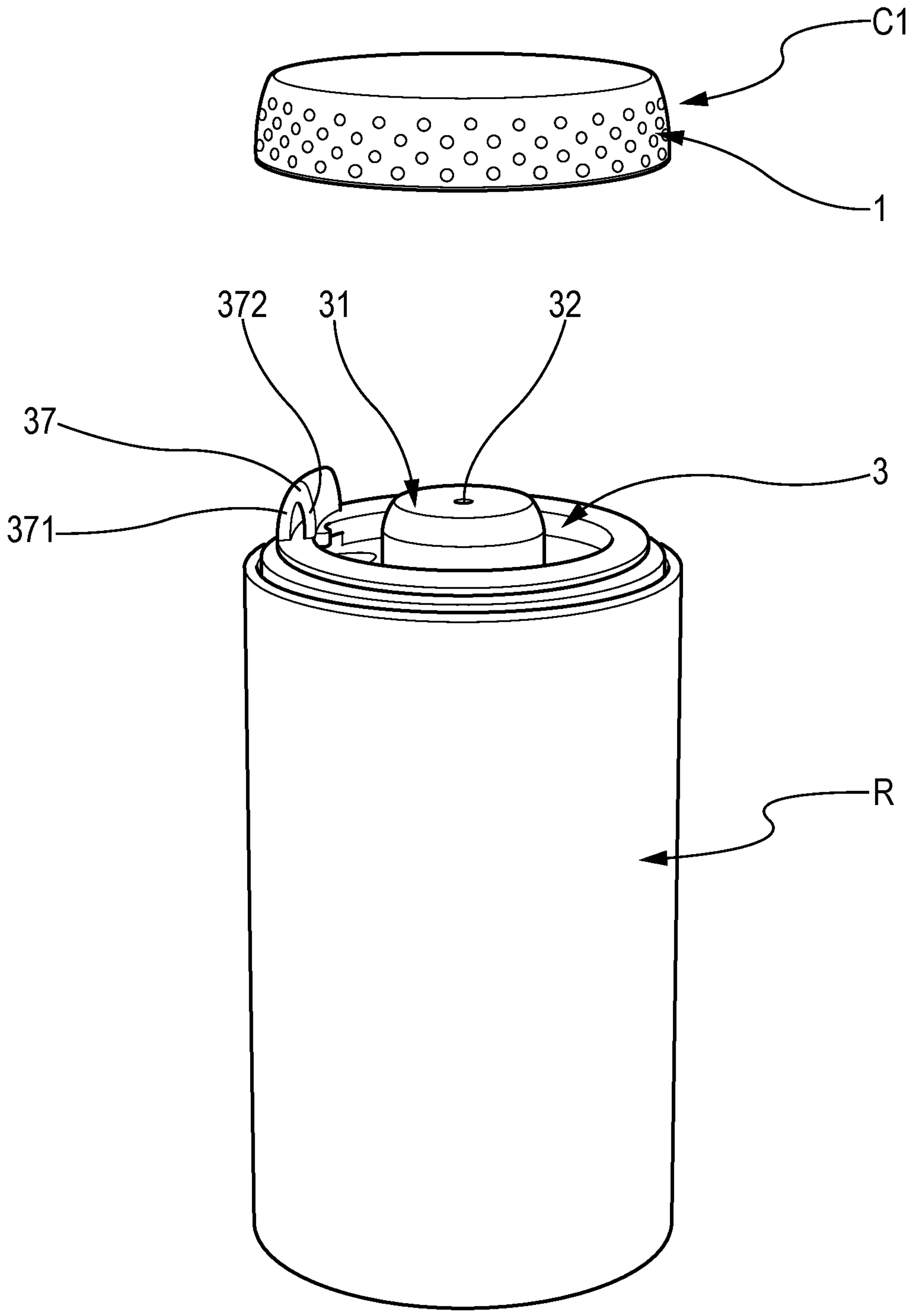
Figure 4:
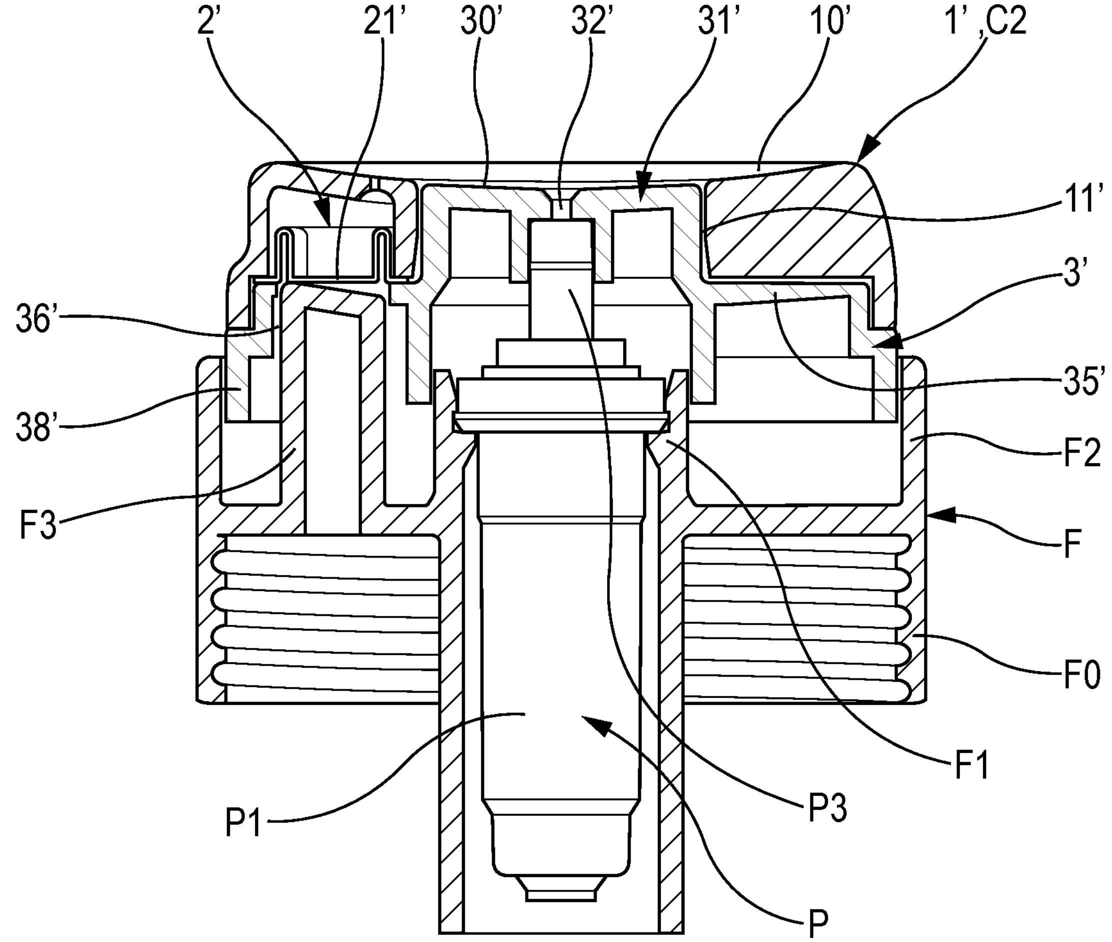
Figure 5:
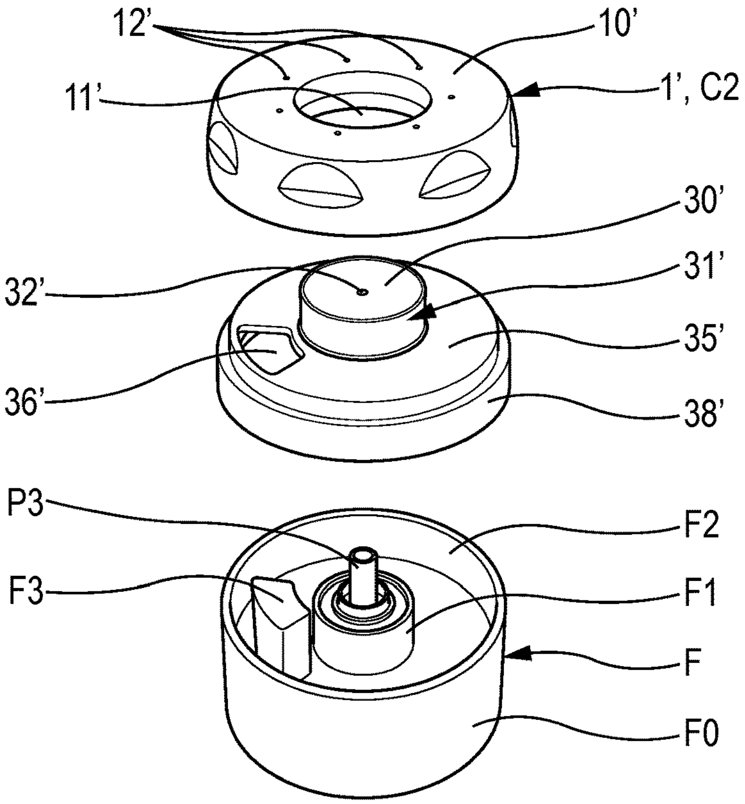
Figure 6:
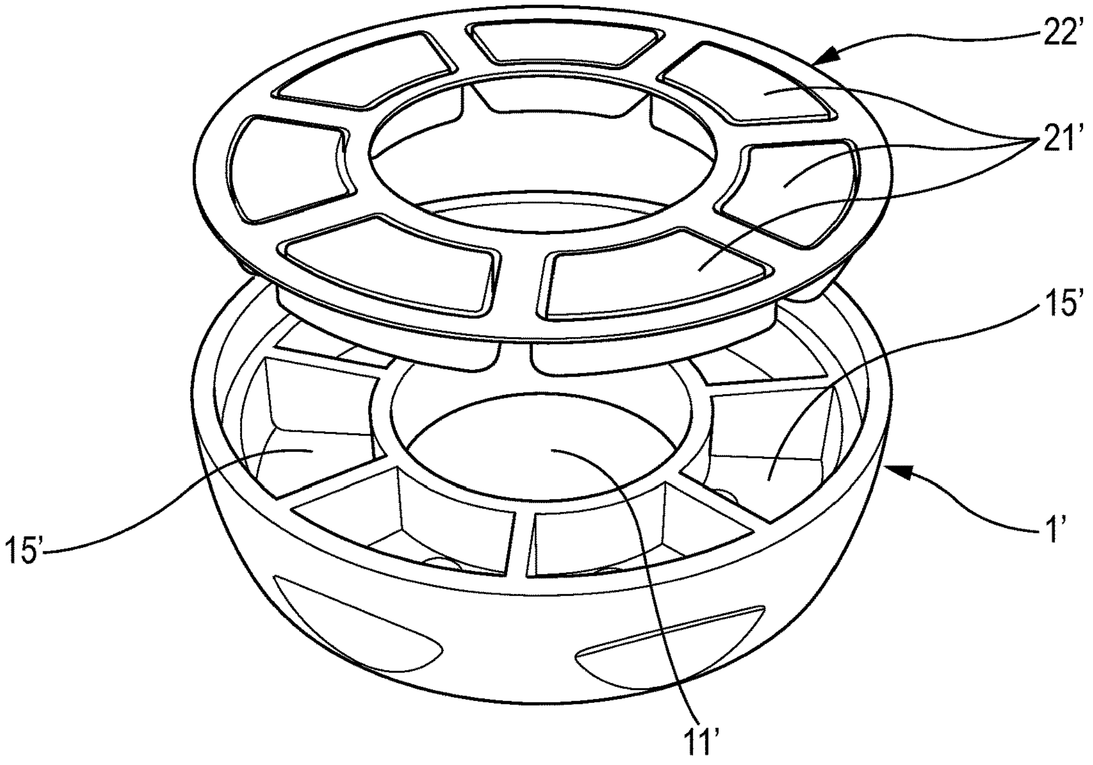
Figure 7A:
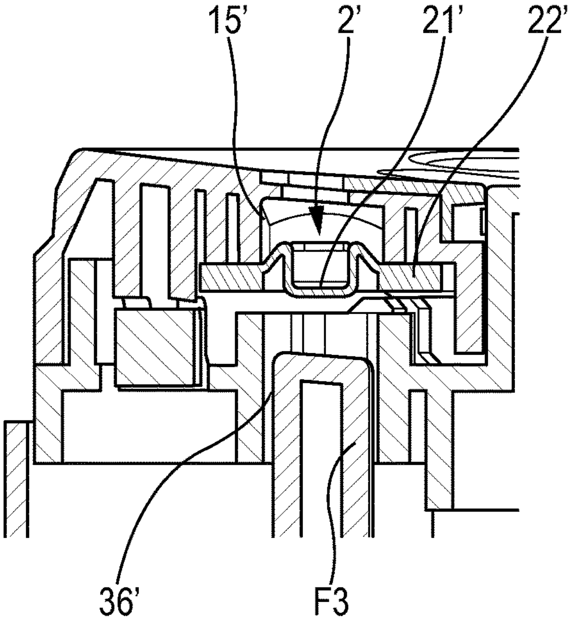
Figure 7B:
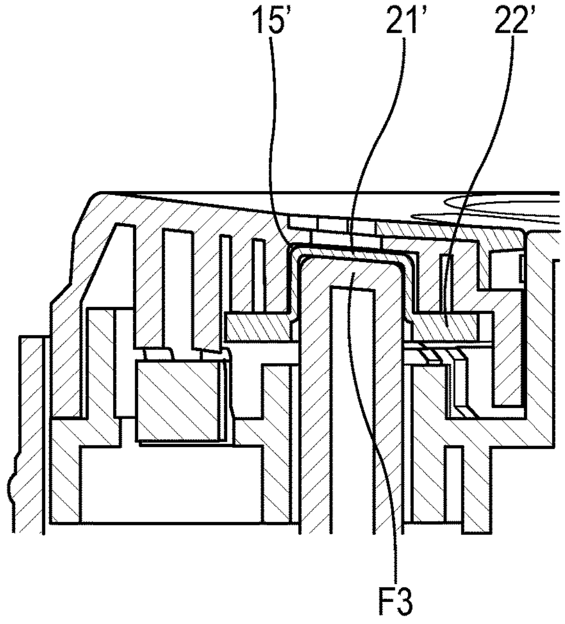
Figure 8A:
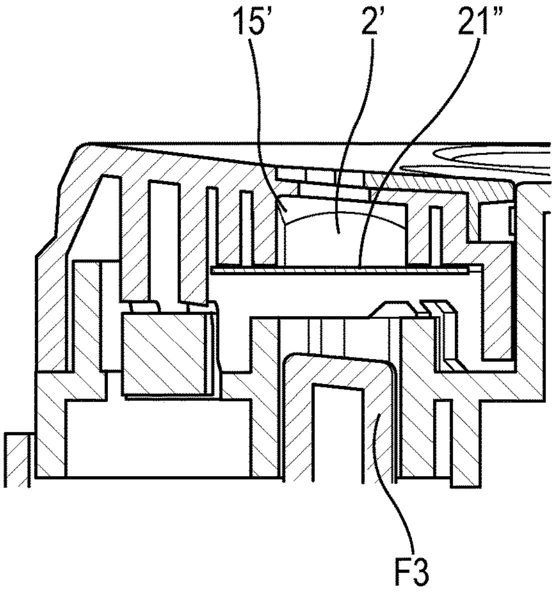
Figure 8B:
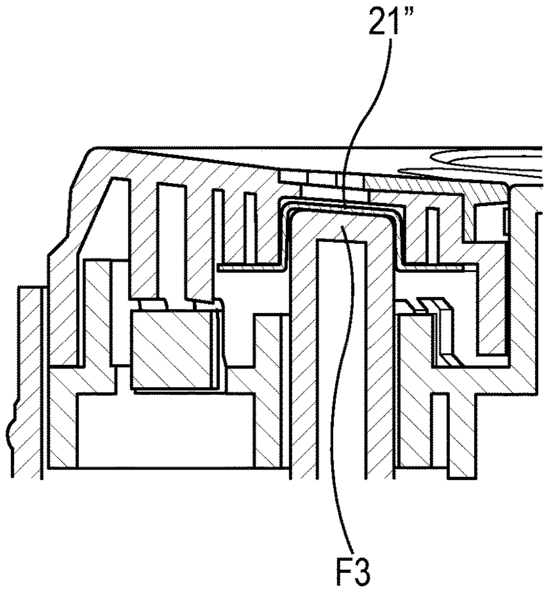
Figure 9:
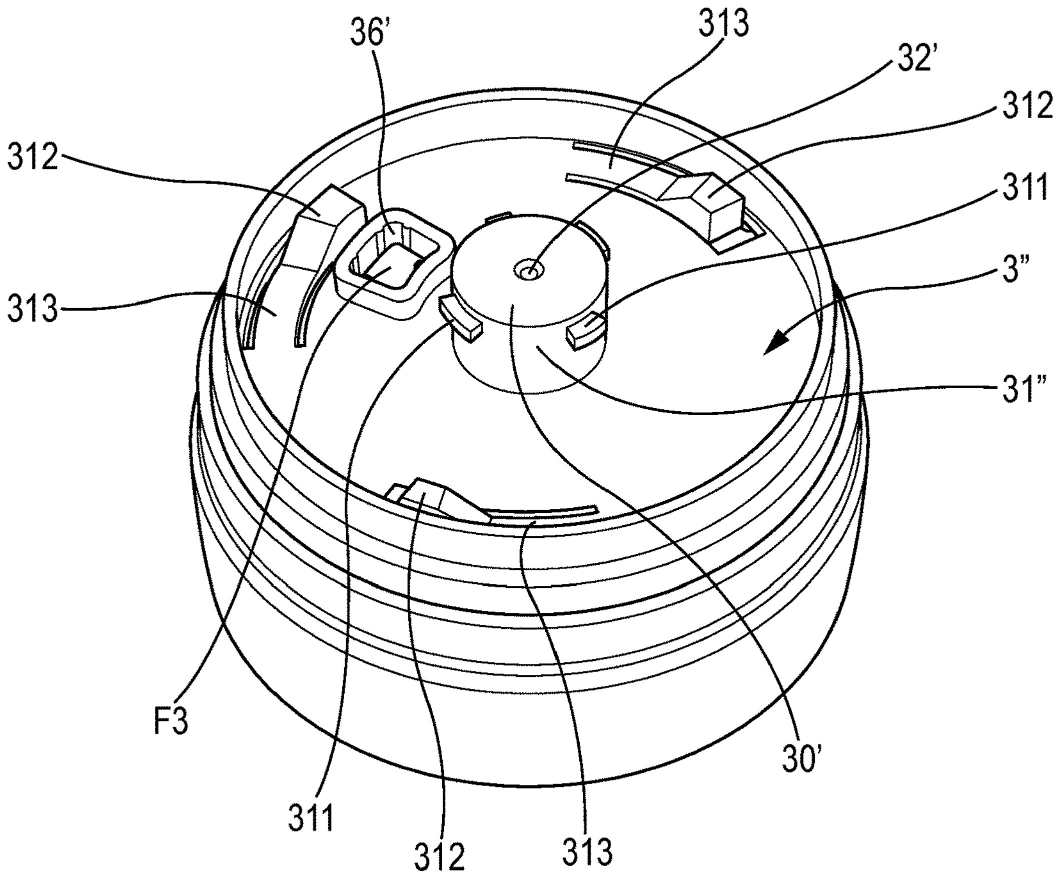
Figure 10:
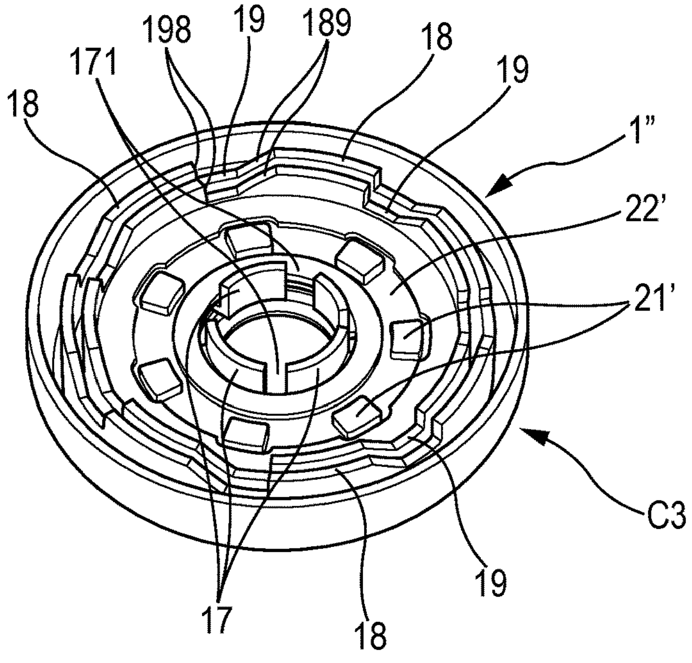

In the figures:

FIG. 1 is a vertical cross sectional view through a dispenser in accordance with a first embodiment of the invention, in its rest state, FIG. 2 is a view of the dispenser of the figure, in the actuated state, FIG. 3 is a view of the dispenser of FIGS. 1 and 2, with the cartridge separated, FIG. 4 is a vertical cross sectional view through a dispenser in accordance with a second embodiment of the invention, in the rest state, FIG. 5 is an exploded perspective view of the dispenser of FIG. 4, FIG. 6 is an enlarged exploded perspective view of the cartridge of the dispenser in FIGS. 4 and 5, FIGS. 7*a* and 7*b* respectively illustrate the rest and depressed states of the deformable membrane of the dispenser of FIGS. 4, 5 and 6, FIGS. 8*a* and 8*b* respectively illustrate the rest and depressed states of a variation of a deformable membrane, FIG. 9 is a perspective view of a plate in accordance with an embodiment of the invention, FIG. 10 is a perspective view from below of a cartridge in accordance with one embodiment of the invention.

Reference will firstly be made to FIGS. 1, 2 and 3 in order to describe the fluid product dispenser in accordance with the first embodiment of the invention. This dispenser of the invention firstly comprises a fluid product reservoir R, in which a fluid product such as a cream, a gel, a lotion, a serum, etc., is stored. This reservoir R comprises a neck R1 for mounting a dispensing member P, a guide bush R2 that extends around the neck R1 and a pressing stud R3 that extends axially upwards in the annular space defined between the neck R1 and the guide bush R2. The reservoir R may be produced from any material such as a plastic material or a metal.

The dispensing member P may be a pump or a valve, comprising a body P1 defining a fixing collar P2 that engages in the neck R1. The dispensing member P also comprises an actuating pin P3 which is axially movable back and forth inside the body P1 in order to deliver fluid product in a metered or otherwise manner. This design is entirely conventional for a pump or a valve in the fields of cosmetics, perfumery, or indeed pharmacy. The dispensing member P is not critical for the present invention; it will not be described in any further detail.

The dispenser also includes a plate 3, which is mounted on the free end of the actuating pin P3 of the dispensing member P. The plate 3 is therefore axially movable with the actuating pin P3. The plate 3 comprises a head 31 that covers the actuating pin P3. To this end, the head 31 comprises a sleeve 33 which is force-fitted and/or snap-fitted onto the free end of the actuating pin P3. Downstream of the actuating pin P3, the head 31 forms a through hole 32, via which the fluid product delivered by the dispensing member P passes. The head 31 surrounds the actuating pin P3 and even extends around the neck R1 with a skirt 34, which will participate in guiding the plate 3 on the reservoir R. The plate 3 also comprises an annular flange 35 that extends radially outwards from the head 31. This annular flange 35 forms an axial through aperture 36, in which the pressing stud R3 of the reservoir R is engaged. The flange 35 also forms an elastic tab 37 the function of which is to generate the sensation of the passage over hard radial points when indexing the push button. It removes the radial rotational play and makes it possible to generate a certain axial retention in order to prevent loss of the removable cartridge while allowing it to be positioned. Finally, on its outer periphery, the plate 3 forms a guide ring 38 that is engaged inside the guide bush R2 of the reservoir R so as to guide the plate axially in a stable manner.

Thus, axial pressure on the head 31 causes the actuating pin P3 to be pushed into the body P1 of the dispensing member P, causes the skirt 34 to slide about the neck R1, causes the pressing stud R3 to slide in the axial through aperture 36, and causes the ring 38 to slide inside the bush R2 of the reservoir R. The fluid product delivered by the dispensing member P passes through the through hole 32 of the head 31.

The dispenser of the invention also comprises a push button 1 that is mounted on the plate 3, so that it will also move axially back and forth with the plate 3 and the actuating pin P3. This push button 1 includes a collection area 10, which preferably has a slightly curved shape. This collection area 10 is initially perforated through by an axial or central main outlet orifice 11, which is aligned with the through hole 32 of the head 31 of the plate 3. Thus, the fluid product coming from the dispensing member P is delivered through the actuating pin P3, the through hole 32 and the main orifice 11 to enter the collection area 10. In addition to the main orifice 11, the collection area 10 is also perforated by a plurality of secondary outlet orifices 12, which extend around the main orifice 11. Upstream of the secondary orifices 12, the push button 1 forms puncturing needles 13 the function of which will be explained below. These puncturing needles 13 protrude into internal housings 15, which are defined by tubes 14 extending downwards from the collection area 10. The tubes 14 may be separated from one another or, in contrast, they may be contiguous, so as to form a ring. In accordance with the invention, secondary reservoirs, in the form of crushable capsules 2, are respectively received in the internal housings 15. These crushable capsules 2 may be in the form of small eggs comprising a flexible outer shell filled with a fluid product, which may be identical to, but preferably different from, that of the reservoir R. The crushable capsule 2 comprises a lower wall 21 that is situated at the bottom opening of the compartment 15 so as to be accessible. On the other hand, its upper wall comes into unforced contact with the puncturing needle 13. In order to hold the crushable capsules 2 in their respective housings 15, it is possible to provide sufficient friction or indeed a reduced opening, as is the case in FIGS. 1 and 2. On its outer periphery, the push button 1 comprises a gripping ring 16, which may be provided with protruding profiles to promote its hold. The free lower edge of the gripping ring 16 may come into contact with the guide ring 38 of the plate 3.

The housings 15 are formed above the annular flange 35 in a manner such that it is possible to position a housing 15 axially in alignment with the pressing stud R3, as can be seen in FIGS. 1 and 2. The free end of the pressing stud R3 is located in the proximity of the lower wall 21 of the crushable capsule 2 received in the housing 15. The elastic tab 37 of the plate 3 is engaged in the space formed between the tubes 14 and the gripping ring 16 in order to hold the push button 1 on the plate 3, but also to angularly index the push button 1 on the plate 3, passing over hard points, which guide the user during use of the product. More precisely, the flexible tab 37 comprises an anchoring lug 371 and a free lug 372. The anchoring lug 371 comes into engagement with the gripping ring 16 and the free lug 372 comes into engagement with the tubes 14 (separate or contiguous), for example by snap fitting, in order to create the hard or stable points, each corresponding to the axial alignment of a secondary reservoir or capsule 2 above the pressing stud R3. The elastic tab 37 therefore carries out an angular positioning function in order to guarantee the successive axial alignment of the secondary reservoirs 2 above the pressing stud R3.

The push button 1, with its secondary reservoirs 2 in the form of crushable capsules, may be permanently mounted on the plate 3, but preferably, the push button 1 and its crushable capsules 2 are mounted on the plate 3 in a removable manner so as to constitute a removable cartridge unit, which can also be described as a refill. This removable cartridge unit can be seen more clearly in FIG. 3, which shows the cartridge unit C1 ready to be attached to the plate 3. Once in place, the starting position of FIG. 1 is attained. A user can then press on the push button 1, for example on the outer edge of the collection area 10, so as to drive it downwards in the direction of the reservoir R. This depression of the push button 1 has the effect of causing the plate 3 to descend and of pushing the actuating pin P3 into the body P1 of the dispensing member P. The fluid product coming from the dispensing member P is thus delivered through the actuating pin P3, the through hole 32 and the main orifice 11, so as to spread over the collection area 10, as can be seen in FIG. 2. Simultaneously, the pressing stud 3 penetrates into the housing 15 and comes into engagement with the lower wall 21 of the crushable capsule 2. This latter is therefore pushed strongly against the puncturing needle 13, which will pierce its flexible outer shell. The fluid product that it contains can then escape through the secondary orifice 12 to spread over the collection area 10, to the side of, but eccentrically with respect to the fluid product coming from the dispensing member P. The user can then mix the two fluid products on the collection area 10, before applying the mixture to the target surface, which may be the skin, the nails, the hair, etc.

Since the dispenser comprises only one pressing stud R3, only one secondary reservoir 2 is stressed and emptied each time the push button 1 is actuated. In order to dispense fluid products anew, the push button 1 must be rotated on the plate 3 so as to position another secondary reservoir 2 in axial alignment with the pressing stud R3. The actuation operation can then be repeated. By providing eight secondary reservoirs 2 distributed equally around the main orifice 11, for example, the user has to rotate the push button 1 about the axis X by an angle of 45° in order to pass from one secondary reservoir 2 to the next. As will be seen below, the dispenser may be provided with angular positioning means, making it possible to fix the angular position of the push button 1 with respect to the pressing stud R3, so that each secondary reservoir 2 in turn is positioned in an aligned manner above the pressing stud R3.

It should be noted that in this first embodiment of the invention, the push button 1 forms both the main orifice 11 as well as the secondary outlet orifices 12, on a single common collection area 10, on which mixing of the fluid products can be carried out. The cartridge unit C1, constituted by the push button and its secondary reservoirs 2, is then in the form of a disk or a puck, as can be seen in FIG. 3.

Reference will now be made to FIGS. 4, 5, and 6 in order to describe a second embodiment of a fluid product dispenser of the invention. The dispensing member P may be strictly identical or similar to that of the first embodiment, with a body P1 and an actuating pin P3. In this case, the dispensing member P is received in a neck F1 which is formed by a securing ring F. The securing ring also comprises a threaded skirt F0, a guide bush F2 and a pressing stud F3. The architecture of this securing ring F is comparable to that of the reservoir R in the first embodiment in FIGS. 1 to 3.

The plate 3' comprises a head 31' that is also mounted on the free end of the actuating pin P3. The head 31' here defines an axial or central main outlet orifice 32', as well as a main collection area 30' that extends around the main orifice 32'. The plate 3' also comprises an annular flange 35 ' that is pierced through by an axial through aperture 36' in which the pressing stud F3 is engaged, just as in the first embodiment of the invention. The plate 3' comprises a guide ring 38' that is engaged inside the guide bush F2 of the securing ring F, just as in the first embodiment of the invention.

The push button 1' is mounted on the plate 3' around the head 31'. In this regard, the push button 1' defines a central through opening 11', in which the head 31' is engaged. The push button 1' forms a secondary collection area 10' which extends all around the main collection area 30', preferably in a contiguous and flush manner, so as to avoid any deposits or residues of fluid at the junction of the two areas.

The secondary collection area 10' is formed with secondary outlet orifices 12' that communicate with secondary reservoirs 2' located below the secondary collection area 10'. With reference to FIG. 6, it can be seen that the push button 1' forms internal compartments 15' around the central through opening 11'. These internal compartments 15' are sealed by deformable membranes 21' integrally formed by a ring 22'. As will be understood from FIG. 6, the ring 22' with its deformable membranes 21' is fitted inside the push button 1' and fixed in a sealed manner, for example by welding or bonding. The secondary reservoirs 2' thus formed by the compartments 15' and the deformable membranes 21' contain a fluid product which is preferably different from that dispensed by the dispensing member P. In this embodiment, the deformable membrane 21' is a fold-back membrane as will be described below.

The push button 1' is axially mounted on the plate 3' by passing the head 31' through the central through opening 11'. The push button 1' can be permanently mounted on the plate 3', but preferably, the push button 1' and its membrane ring 22' constitute a removable cartridge unit C2, which the user can remove from the plate 3' once the secondary reservoirs 2' have been emptied.

As in the first embodiment of the invention, it is possible to provide angular positioning means in order to axially align each reservoir 2' above the pressing stud F3. The operation of this second dispenser of the invention is strictly identical to that of the first embodiment in FIGS. 1 to 3. The user can press on the push button 1', for example at its outer periphery. The plate 3' is driven downwards, which has the effect of causing the actuating pin P3 to be pushed into the body P1 of the dispensing member P. Fluid product is then delivered through the actuating pin P3 and the main orifice 32', so that it spreads over the main collection area 30'. Simultaneously, the deformable membrane 21' is displaced by the pressing stud F3 so as to deliver the contents of the secondary reservoir 2' through the secondary outlet orifice 12'. The fluid product is then present at the secondary collection area 10', which surrounds the central collection area 30'. The user can mix the two products before applying them to the desired target surface.

In this second embodiment of the invention, it should be noted that the removable cartridge unit C2 is in the form of a disk or, more precisely, it is doughnut-shaped, also known as a "donut".

FIGS. 7*a* and 7*b* make it possible to understand the behavior of the deformable membrane 21' when it is stressed by the pressing stud F3. In FIG. 7*a*, the dispenser is in the rest state, with the pressing stud F3 clearly engaged in the through aperture 36', but still disposed out of contact with the membrane 21'. It should be noted that the membrane 21' forms a sort of bowl which is oriented downwards in the direction of the pressing stud F3. FIG. 7*b* shows the state of the membrane 21' after the action of pressing of stud F3. It should be noted that the bowl formed by the membrane 21' has literally been turned through, so as to come into contact with the internal walls of the compartment 15'. The volume of the secondary reservoir is then close to zero. It will be understood that the membrane 21' has been deformed by an action of inversion or folding back, without significant stretching. By means of this fold-back membrane 21', it is possible to produce large-capacity secondary reservoirs 2', while ensuring that they are emptied almost completely without risk of rupture of the membrane.

In accordance with a variational embodiment, the fold-back membrane 21' may simply be replaced by a stretchable membrane 21", which closes the compartments 15' so as to form the secondary reservoirs 2'.

This stretchable membrane 21' may be in the form of a flat film, as can be seen in FIG. 8*a*. Following the action of the pressing stud F3, this stretchable film 21' is deformed inside the compartment 15' in a manner such as it comes closer to its internal walls, thereby significantly reducing the volume of the reservoir.

FIGS. 9 and 10 aim to illustrate removable connection means and angular positioning means between a plate 3" and a cartridge unit C3. These removable connection means and these angular positioning means can easily be implemented in the second embodiment of the invention in FIGS. 4 to 6 and also in the first embodiment in FIGS. 1 to 3 with some adaptations, by replacing the elastic tab 37, which also fulfils the functions of removable connection and angular positioning.

In FIG. 9, it can be seen that the plate 3" also comprises a head 31" defining a central or axial main outlet orifice 32', as in the second embodiment of the invention. This main orifice 32' is surrounded by a main collection area 30', as in the second embodiment. However, it should be noted that the head 31" comprises several tenons 311 that project radially outwards from the peripheral wall of the head 31". In FIG. 9, four tenons 311 can be seen that are distributed substantially equidistantly over the periphery of the head. The tenons 311 do not all have the same width, so that they constitute a kind of key that can be inserted with a predetermined angular orientation. The plate 3" also includes an axial through aperture 36', in which the pressing stud F3 is engaged. To the outside of the aperture 36', the plate 3' comprises three teeth 312 that are mounted on elastic tabs 313. Thus, these teeth 312 can execute an axial movement by deflection of the tabs 313.

FIG. 10 shows a removable cartridge unit C3 comprising a push button 1" associated with a ring 22' forming deformable membranes 21'. To the inside of the ring 22', the push button 1" forms four cylinder segments 17 separated by axial slots 171 with distinct widths. These cylinder segments 17 constitute a kind of lock intended to co-operate with the key of the plate 3" constituted by the tenons 311 with different widths. More precisely, the tenons 311 can be inserted into the slots 171 separating the cylinder segments 17, but only at a single predetermined angular position, which is imposed by the widths of the tenons 311 and the slots 171 separating the cylinder segments 17. Once fully engaged between the cylinder segments, the tabs 311 can engage under the cylinder segments 17 so as to allow rotation of the cartridge unit C3 on the plate 3". Rotation of the cartridge unit C3 is therefore possible until the tenons 311 reach their starting position facing their respective slots 171. From this position, the tabs 311 can again be removed through the slots 171 separating the cylinder segments 17. In this manner, the cartridge unit C3 is integral with the plate 3" over a complete revolution, i.e. 360°.

Still in FIG. 10, it can be seen that the push button 1" forms crenellated profiles around the ring 22'. These crenellated profiles comprise peaks 18 and troughs 19 separated by slopes 189. There are as many peaks 18, troughs 19 and slopes 189 as there are secondary reservoirs, and therefore deformable membranes 21'. These crenellated profiles are intended to cooperate with the teeth 312 mounted on the flexible tabs 313. The rotation of the cartridge unit C3 on the plate 3" is possible by deforming the tabs 313 so as to bring the teeth 312 onto the peaks 18, then into an adjacent trough 19. In this manner, the angular position of each deformable membrane 21' in alignment with the pressing stud F3 is ensured. After each actuation of the cartridge unit C3, the user will turn the cartridge unit C3 so as to bring the teeth 312 from one trough 19 to the next trough, passing through a peak 18. When all the secondary reservoirs have been emptied, a final rotation makes it possible to bring the tenons 311 to the level of their respective slots 171 and the teeth 312 will then eject the cartridge unit C3 because the teeth 312 are then positioned at a peak 18, which generates the deformation of the flexible tabs 313. The crenellated profiles also include steep slopes 198, preventing rotation of the cartridge unit C3 in the counterclockwise direction.

Removable connection means therefore make it possible to connect the cartridge unit to the plate 3" over a complete revolution, at the end of which the cartridge unit C3 is ejected by the teeth 312 elastically biased by the tabs 313.

Angular positioning means make it possible to position each secondary reservoir accurately above the pressing stud F3.

In all of the embodiments, the secondary reservoirs 2, 2' each comprise a mobile wall (lower wall 21—fold-back membrane 21'—stretchable membrane 21") which serves to reduce its volume so as to deliver its contents from the secondary reservoir.

The invention thus provides a dispenser having a rotary push button, and advantageously a removable push button, which comprises as many secondary outlet orifices as there are secondary reservoirs. The plate mounted on the actuating pin of the dispensing member allows for stable reception and guided axial movement.

The invention claimed is:

1. A fluid product dispenser comprising:

a dispensing member connected to a main reservoir containing a first fluid product, the dispensing member communicating with a main axial outlet orifice which moves along an actuation axis; and a plurality of secondary reservoirs containing a second fluid product and each having a mobile wall in order to reduce a volume of the secondary reservoir and deliver the second fluid product from the secondary reservoir, a push button that can be moved along the actuation axis carrying the main outlet orifice with, wherein the push button defines as many secondary outlet orifices as there are secondary reservoirs, the secondary outlet orifices being distinct from the main axial outlet orifice and surrounding the main axial outlet orifice, each secondary outlet orifice being fed from a secondary reservoir in response to the movement of the mobile wall brought about by the movement of the push button along the actuation axis.

2. The dispenser as claimed in claim 1, in which the push button and the secondary reservoirs form a removable cartridge unit, which is rotatably mounted about the main axial outlet orifice and the actuation axis.

3. The dispenser as claimed in claim 2, in which the removable cartridge unit is elastically ejected from the dispensing member after a rotational displacement over a predetermined angle, advantageously of the order of 360°.

4. The dispenser as claimed in claim 2, in which the mobile wall of each secondary reservoir comes into successive engagement with a fixed stud for pressing under the action of the push button.

5. The dispenser as claimed in claim 4, comprising angular positioning means for fixing the angular position of each secondary reservoir in turn by rotation to above the fixed pressing stud.

6. The dispenser as claimed in claim 1, in which the main outlet orifice is surrounded by a main collection area that is integral with the dispensing member, the secondary outlet orifices are surrounded by a secondary collection area formed by the push button, the two main and secondary areas being connected in alignment.

7. The dispenser as claimed in claim 6, in which the main area is central and the secondary area surrounds the main area.

8. The dispenser as claimed in claim 1, in which the push button defines both the main axial outlet orifice and the secondary outlet orifices, surrounded by a single common collection area.

9. The dispenser as claimed in claim 1, in which the push button forms internal housings in which the secondary reservoirs in the form of crushable capsules filled with second fluid product are received, each internal housing advantageously being provided with a puncturing needle that leads to the secondary outlet orifice.

10. The dispenser as claimed in claim 1, in which the push button forms internal compartments sealed by deformable membranes acting as mobile walls.

11. The dispenser as claimed in claim 10, in which the deformable membrane is selected from a fold-back membrane and a stretchable membrane.

12. The dispenser as claimed in claim 1, in which the dispensing member comprises an actuating pin that is movable along the actuation axis, this actuating pin being capped by a plate that is axially movable but prevented from rotating, the plate forming a central head that is engaged with the actuating pin and an off-axis through aperture for a fixed pressing stud that locks the plate against rotation, the push button being removably mounted on the plate and rotatable about the central head so as to be able to position a secondary reservoir one at a time above the fixed pressing stud which will crush the secondary reservoir and therefore deliver second fluid product through the secondary outlet orifice each time the push button is actuated, which simultaneously causes the dispensing member to be actuated to deliver the first fluid product through the main axial outlet orifice.

13. The dispenser as claimed in claim 12, in which the central head forms the main axial outlet orifice and a main collection area that surrounds the main axial outlet orifice.

14. The dispenser as claimed in claim 12, in which the central head is covered by the push button that forms both the main axial outlet orifice and the secondary outlet orifices, surrounded by a single common collection area.

15. The dispenser as claimed in claim 1, wherein the dispensing member is a pump or a valve.

16. A fluid product dispenser comprising:

a dispensing member connected to a main reservoir containing a first fluid product, the dispensing member communicating with a main axial outlet orifice which moves along an actuation axis; and secondary reservoirs containing a second fluid product having a composition different from a composition of the first fluid product, each of the secondary reservoirs having a mobile wall configured to reduce a volume of the secondary reservoir and deliver the second fluid product from the secondary reservoir;

a push button configured to move, together with the main orifice, along the actuation axis when pushed;

wherein the push button comprises secondary outlet orifices, each corresponding to one of the secondary reservoirs, the secondary outlet orifices being distinct and separate from the main axial outlet orifice and surrounding the main axial outlet orifice, each secondary outlet orifice configured to selectively be brought into fluid communication with the corresponding one of the secondary reservoirs in response to movement of the respective mobile wall by movement of the push button along the actuation axis.

17. The dispenser as claimed in claim 16, wherein each of the secondary reservoirs is sealed prior to the secondary outlet orifice brought into fluid communication with the corresponding one of the secondary reservoirs.

18. The dispenser as claimed in claim 16, further comprising a projection configured to selectively pierce each of the secondary reservoirs so that the secondary outlet orifice is brought into fluid communication with the corresponding one of the secondary reservoirs.

19. The dispenser as claimed in claim 16, wherein each of the secondary reservoirs is a sealed capsule that is crushable by movement of the respective mobile wall in order to expel the second fluid stored within the reservoir.

20. The dispenser as claimed in claim 16, wherein a puncturing member extends from each secondary outlet orifice in a direction of the corresponding secondary reservoir.

* * * * *